United States Patent
Nomura et al.

(10) Patent No.: US 8,636,090 B2
(45) Date of Patent: Jan. 28, 2014

(54) HYBRID VEHICLE

(75) Inventors: Akifumi Nomura, Saitama (JP); Shinichi Wagatsuma, Saitama (JP); Kazuyuki Nakai, Saitama (JP); Kenichi Ohmori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 992 days.

(21) Appl. No.: 12/722,988

(22) Filed: Mar. 12, 2010

(65) Prior Publication Data

US 2010/0243348 A1    Sep. 30, 2010

(30) Foreign Application Priority Data

Mar. 31, 2009    (JP) .................................. 2009-087778

(51) Int. Cl.
*B60K 6/42*    (2007.10)
*F16H 57/04*    (2010.01)

(52) U.S. Cl.
CPC .................................. *F16H 57/0439* (2013.01)
USPC .................................... 180/65.22; 180/65.21

(58) Field of Classification Search
CPC ............ B60K 6/383; B60K 6/40; B60B 6/48; B60L 220/12; B60L 2240/421; B60L 2240/441; B60W 2510/081; B60Y 2200/12; B60Y 2200/126; F16H 57/0439
USPC .............. 180/65.21, 65.22; 477/2; 123/41.46, 123/196 R
See application file for complete search history.

(56) References Cited

U.S. PATENT DOCUMENTS

| | | | | |
|---|---|---|---|---|
| 6,656,083 | B2 * | 12/2003 | Esaki ................................. | 477/5 |
| 2005/0187066 | A1 * | 8/2005 | Moses et al. ...................... | 477/2 |
| 2008/0194369 | A1 * | 8/2008 | Boutou et al. .................... | 475/5 |
| 2008/0314687 | A1 * | 12/2008 | Shiozaki et al. ............... | 184/6.5 |
| 2009/0023529 | A1 * | 1/2009 | Sanji et al. ........................ | 475/5 |
| 2009/0095548 | A1 * | 4/2009 | Tamba et al. .............. | 180/65.21 |

FOREIGN PATENT DOCUMENTS

| | | |
|---|---|---|
| EP | 1216871 A2 | 6/2002 |
| JP | 10-2351 A | 1/1998 |
| JP | 10-89446 A | 4/1998 |
| JP | 2003-307270 A | 10/2003 |
| JP | 2007-170358 A | 7/2007 |
| JP | 2008-80986 A | 4/2008 |
| JP | 4203527 B1 | 10/2008 |
| WO | WO 2006/089376 A1 | 8/2006 |

* cited by examiner

*Primary Examiner* — John R Olszewski
*Assistant Examiner* — Brian Cassidy
(74) *Attorney, Agent, or Firm* — Birch, Stewart, Kolasch & Birch, LLP

(57) ABSTRACT

A hybrid vehicle includes an engine; a motor; a power transmission mechanism and an oil pump for lubricating the engine and the power transmission mechanism with the rotation of a crankshaft. The oil pump has an oil pump shaft with an oil pump driven gear on one end thereof through a one-way clutch and an oil pump driven sprocket on the other end of the oil pump shaft through a one-way clutch. The oil pump driven gear is connected to a primary drive gear rotating integrally with a motor driven gear for transmitting the power of the motor to the drive wheel. The oil pump driven sprocket is connected to a cam chain of the engine to be rotated by power of the engine. The motor driven gear is disposed on one side of the crankshaft and the cam chain is disposed on the other side of the crankshaft.

20 Claims, 14 Drawing Sheets

HYBRID VEHICLE

CROSS-REFERENCE TO RELATED APPLICATIONS

The present application claims priority under 35 USC 119 to Japanese Patent Application No. 2009-087778 filed on Mar. 31, 2009 the entire contents of which are hereby incorporated by reference.

BACKGROUND OF THE INVENTION

1. Field of the Invention

The present invention relates to a hybrid vehicle having two drive sources, i.e., an internal combustion engine and an electric motor.

2. Description of Background Art

A power unit for a hybrid vehicle is known such as the power unit disclosed in, for example, JP Patent No. 4203527.

The power unit for a hybrid vehicle as disclosed in JP Patent No. 4203527 includes a first drive path for driving an oil pump through a one-way clutch by a driving force from an electric motor, and a second drive path for driving the oil pump through a one-way clutch by a driving force from an internal combustion engine. The one-way clutches are arranged consecutively (in parallel) in an axial direction on an oil pump driving shaft for driving the oil pump. The oil pump is provided on one side of a crankshaft of the internal combustion engine. This has led to an increased expansion on one side of the crankshaft. Since an internal combustion engine for four-wheeled vehicles is larger than that for two-wheeled vehicles, a space for the arrangement is easily ensured. This allows for the one-sided arrangement of the oil pump on the crankshaft.

However, in two-wheeled vehicles, such lateral expansion is preferably avoided as much as possible. In particular, one-sided expansion of a crankshaft is undesirable.

SUMMARY AND OBJECTS OF THE INVENTION

Accordingly, an object of an embodiment of the present invention is to provide a hybrid vehicle with a reduced lateral expansion, and in particular, a hybrid vehicle eliminating one-sided expansion of a crankshaft.

In order to accomplish the above-mentioned object, an embodiment of the present invention provides a hybrid vehicle including an internal combustion engine; an electric motor; a power transmission mechanism for transmitting powers of the internal combustion engine and the electric motor to a driven portion and an oil pump for lubricating the internal combustion engine and the power transmission mechanism with rotation of a crankshaft. The oil pump has an oil pump shaft provided with a first input portion on one end of the oil pump shaft through a first one-way clutch and a second input portion on the other end of the oil pump shaft through a second one-way clutch. The first input portion is connected to an output portion rotating integrally with a transmission member for transmitting power of the electric motor to the driven portion to be rotated by power of the electric motor, and the second input portion is connected to a cam chain of the internal combustion engine to be rotated by the power of the internal combustion engine. Also, the transmission member is disposed on one side of the crankshaft, and the cam chain is disposed on the other side of the crankshaft.

According to an embodiment of the present invention, the oil pump shaft rotates either with the first input portion rotated by the power of the electric motor or with the second input portion rotated by power of the internal combustion engine, whichever is higher in rotational speed.

According to an embodiment of the present invention, an oil pump main body is located between a crankcase for supporting the crankshaft and the transmission member with the first input portion being located between the oil pump main body and the transmission member.

According to an embodiment of the present invention, the first input portion is provided on one side of the cylinder with the second input portion being provided on the other side of the cylinder.

According to an embodiment of the present invention, an oil pump main body is located between the first input portion and the second input portion.

According to an embodiment of the present invention, the second input portion has a gear ratio allowing higher-speed rotation than the first input portion.

According to an embodiment of the present invention, a splash oil recovery member for receiving lubricating oil is provided on an end of a countershaft of the power transmission mechanism, and the lubricating oil stored in the splash oil recovery member is lubricated through an oil passage within the countershaft.

According to an embodiment of the present invention, a vehicle-speed detecting gear is provided below the countershaft, at such a position as to be soaked in lubricating oil accumulated on a lower surface of a crankcase, and a rib extending forward from the crankcase is directed toward a variable speed gear train of the power transmission mechanism.

According to an embodiment of the present invention, a first input portion is provided on the oil pump shaft of the oil pump for lubricating the internal combustion engine and the power transmission mechanism with the rotation of the crankshaft, and is connected to the output portion rotating integrally with the member for transmitting power of the electric motor to the driven portion. Even when the EV running is performed by the electric motor, therefore, the internal combustion engine and the power transmission mechanism can be lubricated with lubricating oil by driving the oil pump. Thus, even in a stopped state of the crankshaft during the EV running, the internal combustion engine and the power transmission mechanism can be lubricated.

Furthermore, the first input portion rotated by power of the electric motor is provided through the first one-way clutch on one end of the oil pump shaft, and the second input portion connected to the cam chain of the internal combustion engine and rotated by the power of the internal combustion engine is provided through the second one-way clutch on the other end of the oil pump shaft. Therefore, the internal combustion engine and the power transmission mechanism can be lubricated by driving the oil pump selectively using one of the electric motor and the internal combustion engine.

Moreover, the transmission member is disposed on one side of the crankshaft, and the cam chain is disposed on the other side of the crankshaft. With this structure, it is possible to reduce a lateral expansion, and in particular, prevent one-sided expansion of the crank.

According to an embodiment of the present invention, the oil pump rotates either with the first input portion rotated by power of the electric motor or with the second input portion rotated by power of the internal combustion engine, whichever is higher in rotational speed. This allows proper lubrication according to an operating condition.

According to an embodiment of the present invention, the oil pump main body is located between the crankcase for supporting the crankshaft and the transmission member, and the first input portion is located between the oil pump main body and the transmission member. Therefore, the oil pump main body can be disposed in a limited space.

According to an embodiment of the present invention, the first input portion and the second input portion are provided opposite to each other on the cylinder, thereby allowing distribution of a necessary space between both sides of the cylinder, and miniaturization of the oil pump.

According to an embodiment of the present invention, the oil pump main body is located between the first input portion and the second input portion. Thus, the oil pump main body can be disposed in a limited space.

According to an embodiment of the present invention, the second input portion has a gear ratio allowing higher-speed rotation than the first input portion. Therefore, after engine starting, the oil pump is driven by the cam chain, thereby allowing proper lubrication.

According to an embodiment of the present invention, the splash oil recovery member for receiving lubricating oil is provided on an end of the countershaft of the power transmission mechanism, and the lubricating oil stored in the splash oil recovery member is lubricated through the oil passage within the countershaft, thereby allowing efficient recovery and lubrication of the splashed oil.

According to an embodiment of the present invention, the vehicle-speed detecting gear is provided below the countershaft, at such a position as to be soaked in lubricating oil accumulated on the lower surface of the crankcase, and the rib extended forward from the crankcase is directed toward the variable speed gear train of the power transmission mechanism. Therefore, it is possible to efficiently supply lubricating oil to the variable speed gear train by utilizing rotation of the vehicle-speed detecting gear.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
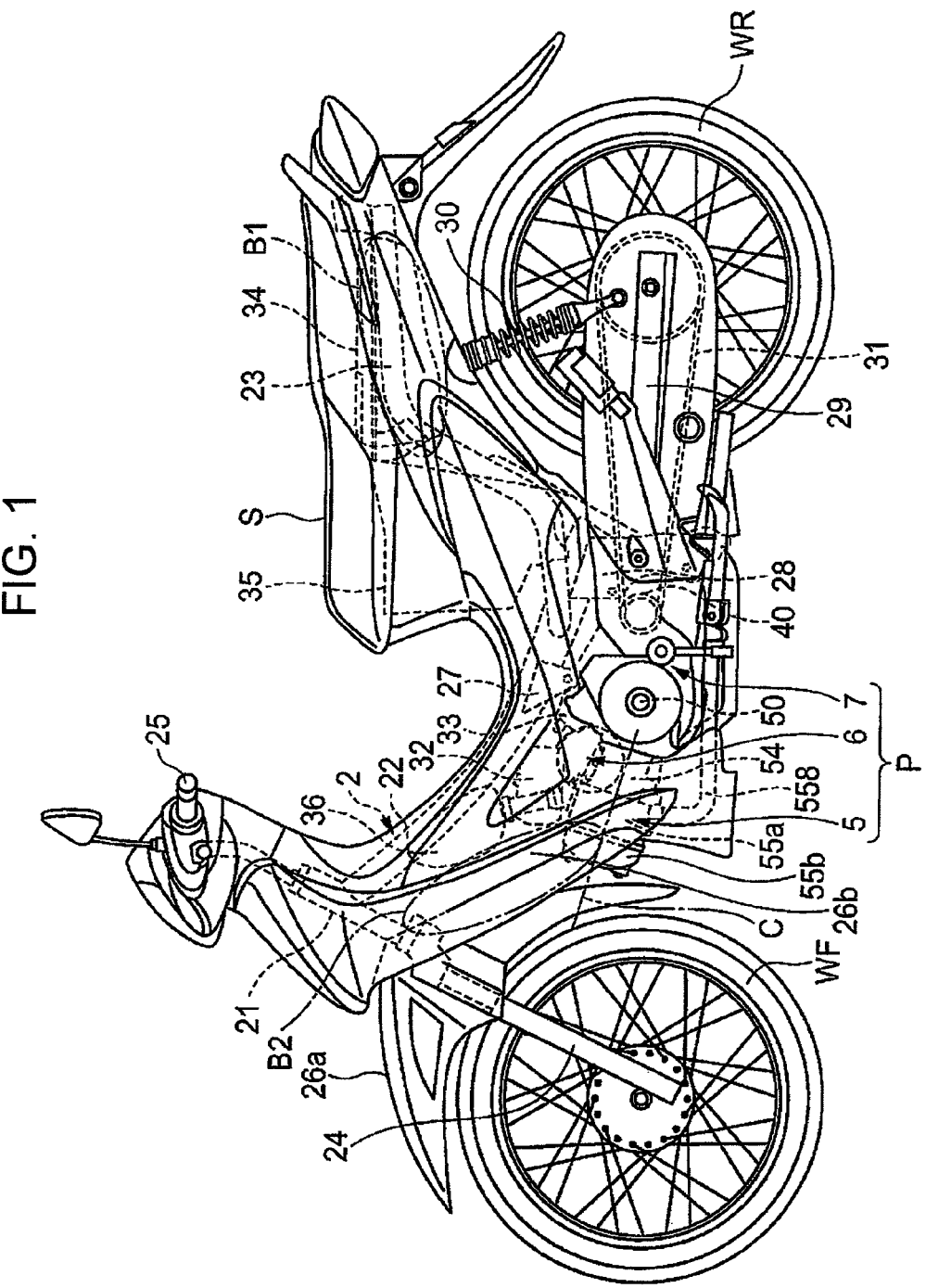
FIG. 1 is a side view of a motorcycle according to an embodiment of a hybrid vehicle of the present invention.

Hereinafter, an embodiment of a hybrid vehicle of the present invention will be described with reference to the accompanying drawings. FIG. 1 is a side view according to an embodiment of the hybrid vehicle of the present invention.

The hybrid vehicle of the present invention is a motorcycle. A body frame 2 of the motorcycle 1 includes a head pipe 21 for steerably supporting a front fork 24, a main frame 22 extending rearward and downward from the head pipe 21, and a pair of left and right rear frames 23 connected to a rear portion of the main frame 22 to extend rearward and upward. A front wheel WF is journaled to a lower end of the front fork 24, and a steering handlebar 25 in a bar shape is coupled to an upper portion of the front fork 24. A front fender 26a for covering the front wheel WF from above is supported by the front fork 24. Also, the motorcycle 1 is provided with leg shields 26b extending rearward and downward from the upper side of the front fender 26a for protecting legs of an occupant.

Below the main frame 22, there is disposed an engine (an internal combustion engine) 5 with a cylinder axis C in a substantially horizontal direction and with a crankshaft 50 (see FIG. 2) provided to be oriented in a vehicle width direction. The engine 5 is suspended by the body frame 2 in such a manner so as to be supported by hanger plates 27 and a pivot plate 28.

A front end of a rear fork 29 is supported swingably in a vertical direction on the pivot plate 28, and a drive wheel WR is journaled to a rear end of the rear fork 29. Also, a rear shock absorber 30 is provided between the rear frames 23 of the body frame 2 and the rear fork 29.

The engine 5, together with a motor (an electric motor) 6 and a power transmission mechanism 7, constitutes a power unit P to be described later. Also, output of the power transmission mechanism 7 is transmitted to the drive wheel WR serving as a driven portion through a drive chain 31.

Figure 12:
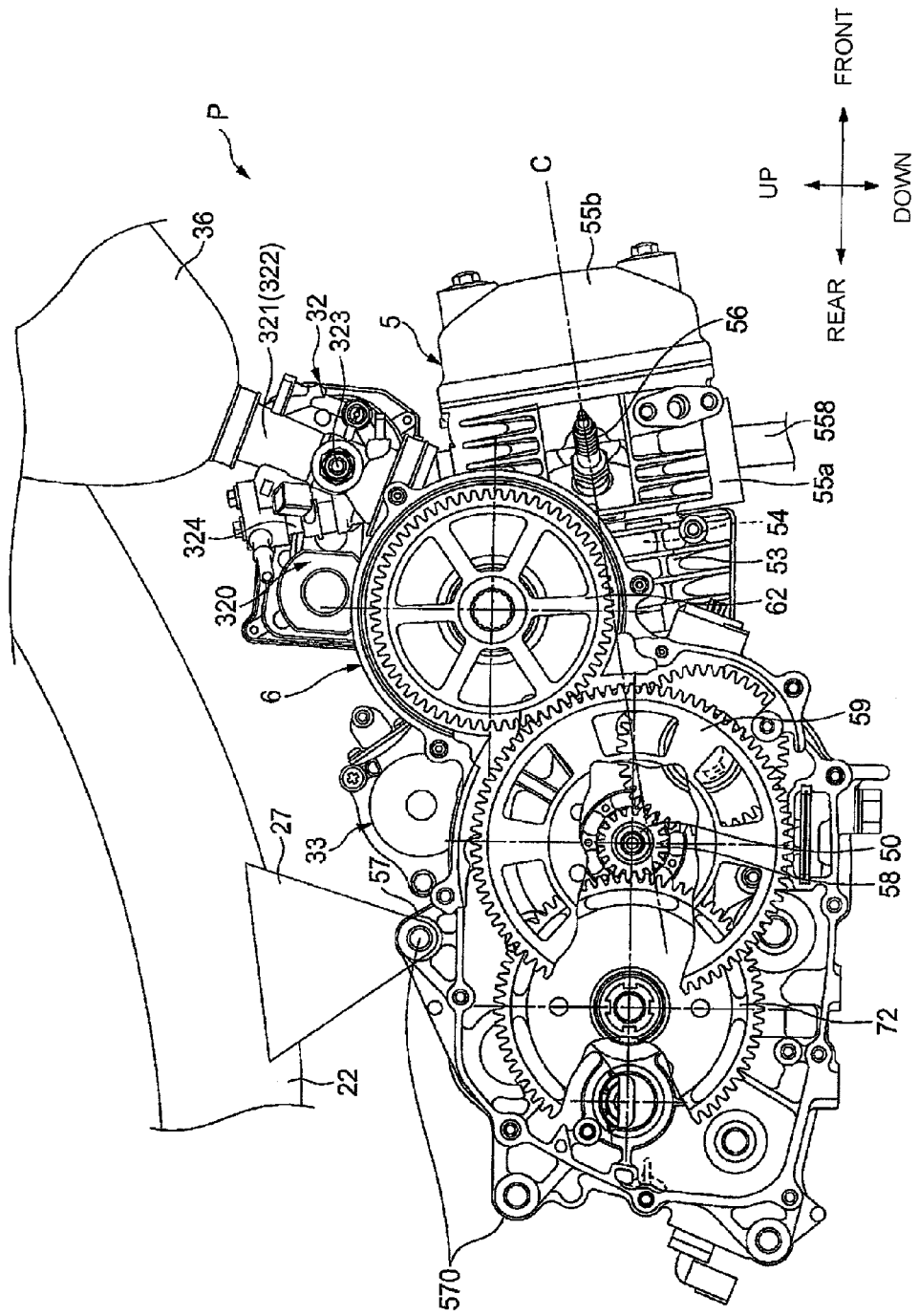
FIG. 12 is a side view with portions broken away of the power unit as seen from a side thereof.

In addition, above the engine 5, there are disposed a throttle mechanism 32, a starter motor 33, and an air cleaner 36 fixed to the main frame 22 (see also FIG. 12). Also, a fuel tank 34 is disposed above the drive wheel WR. A storage box 35 disposed in front of the fuel tank 34, and the fuel tank 34 are openably covered, from above, with a riding seat S such as a tandem seat.

Figure 2:
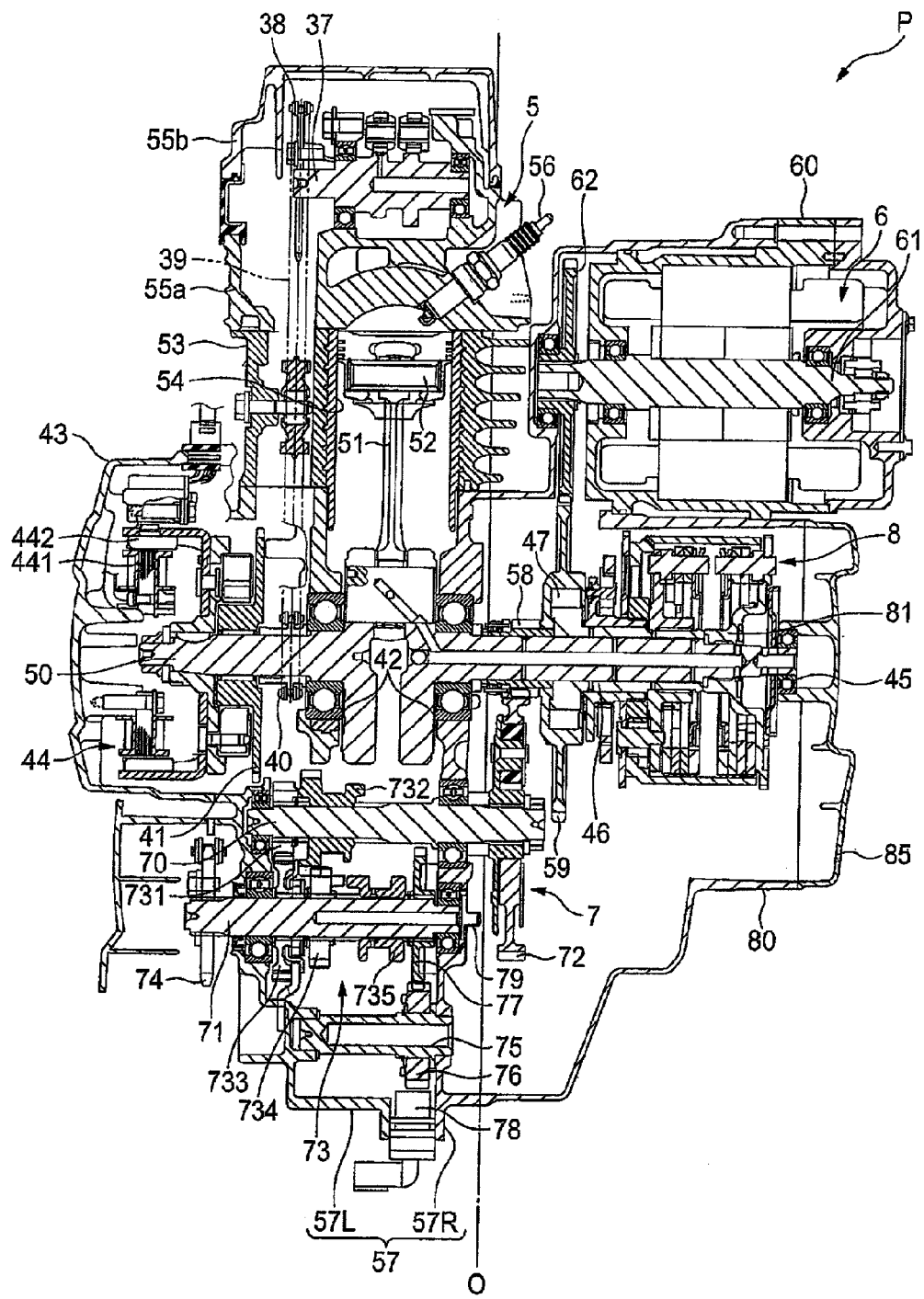
FIG. 2 is an axial sectional view of a power unit for the motorcycle shown in FIG. 1.
Figure 3:
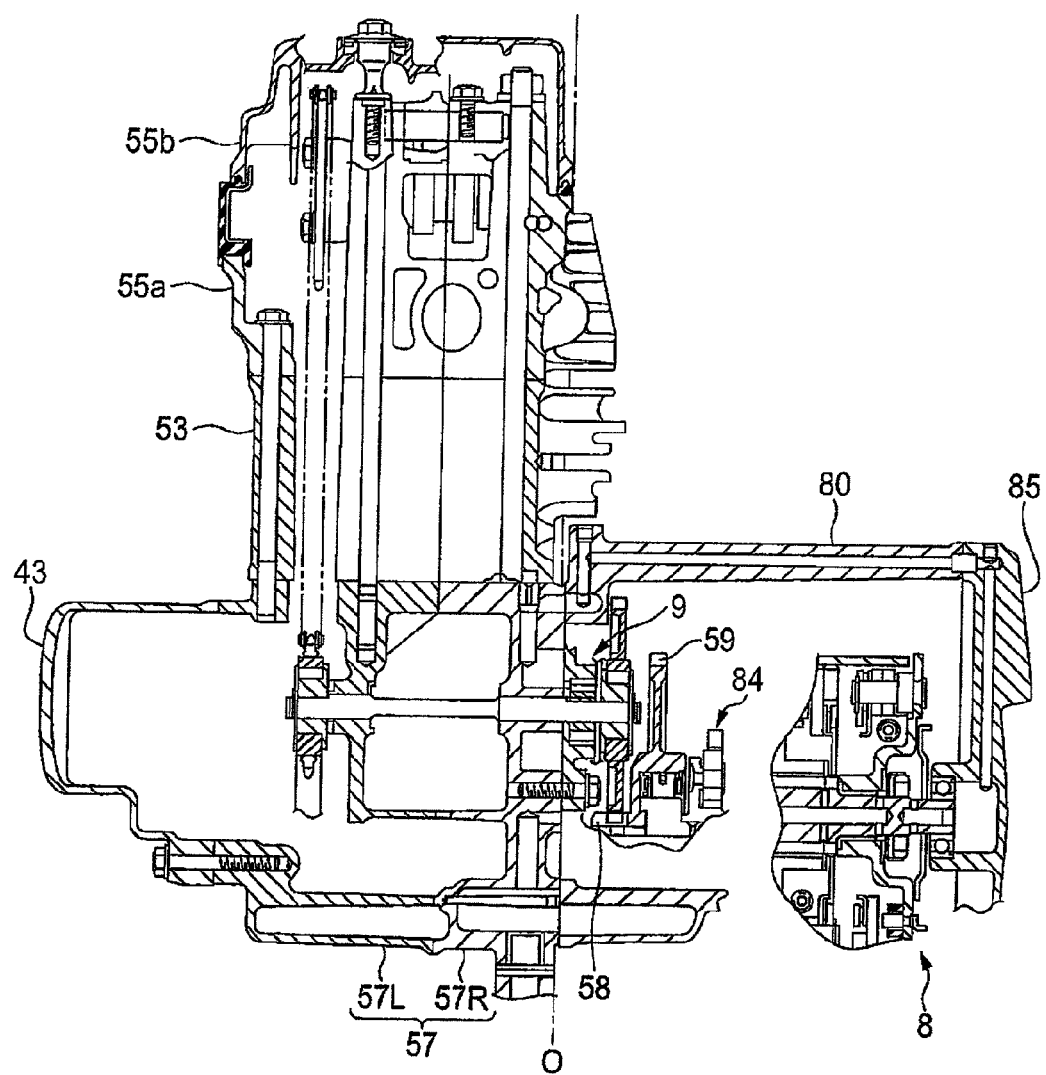
FIG. 3 is a partial sectional view of the power unit for the motorcycle shown in FIG. 1.
Figure 4:
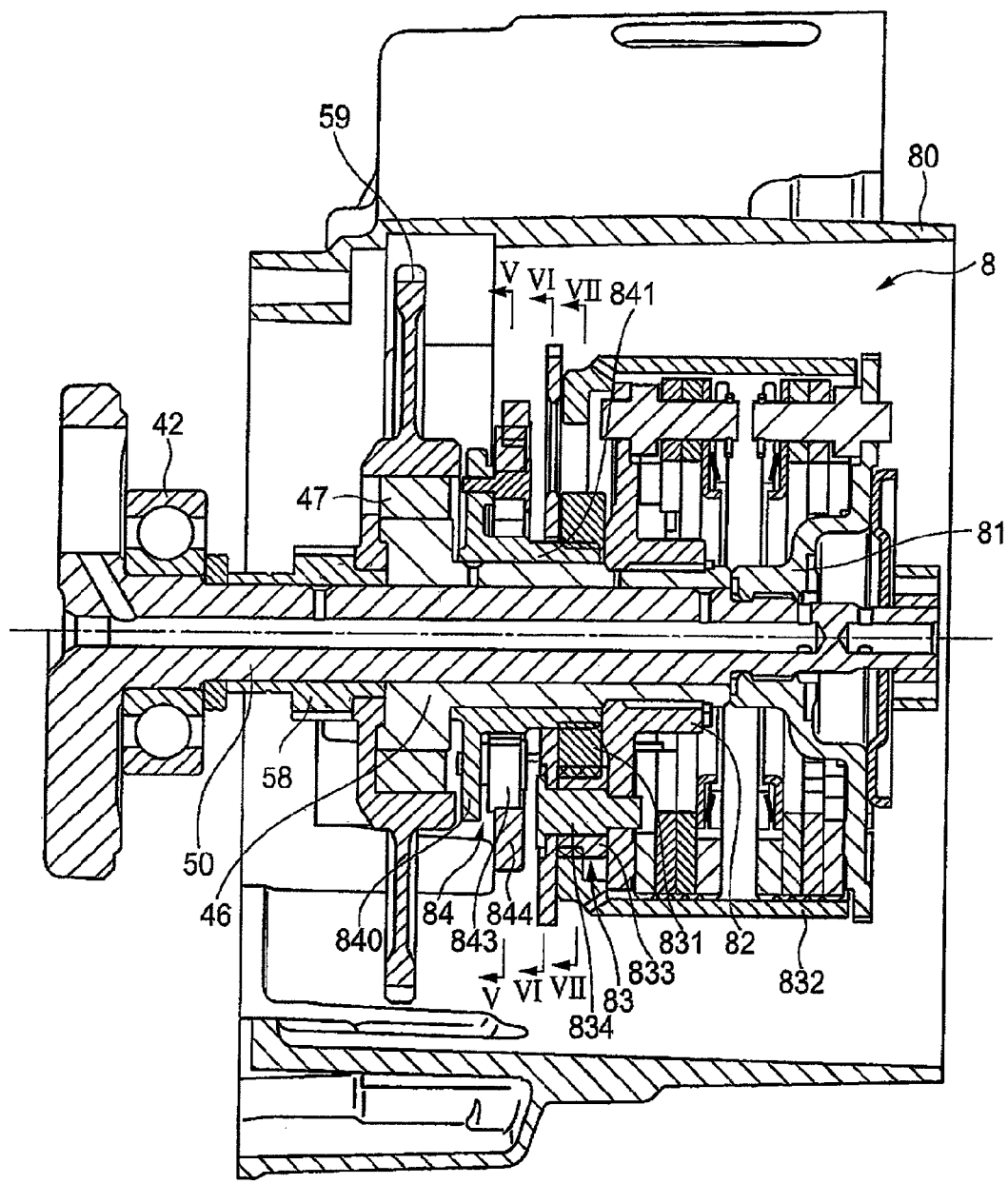
FIG. 4 is a sectional view of a variable speed mechanism of the power unit.
Figure 5:
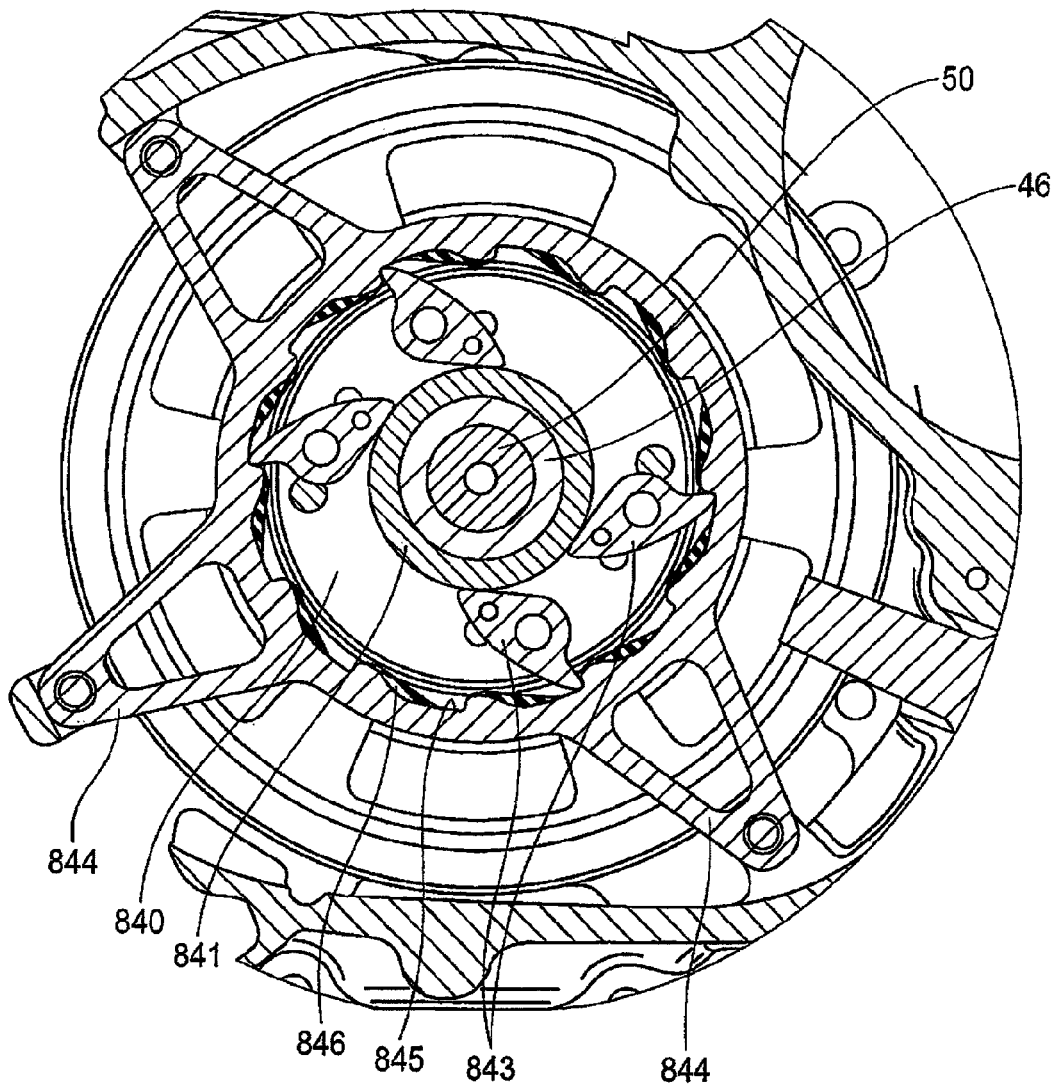
FIG. 5 is a sectional view taken along the line V-V of FIG. 4.
Figure 6:
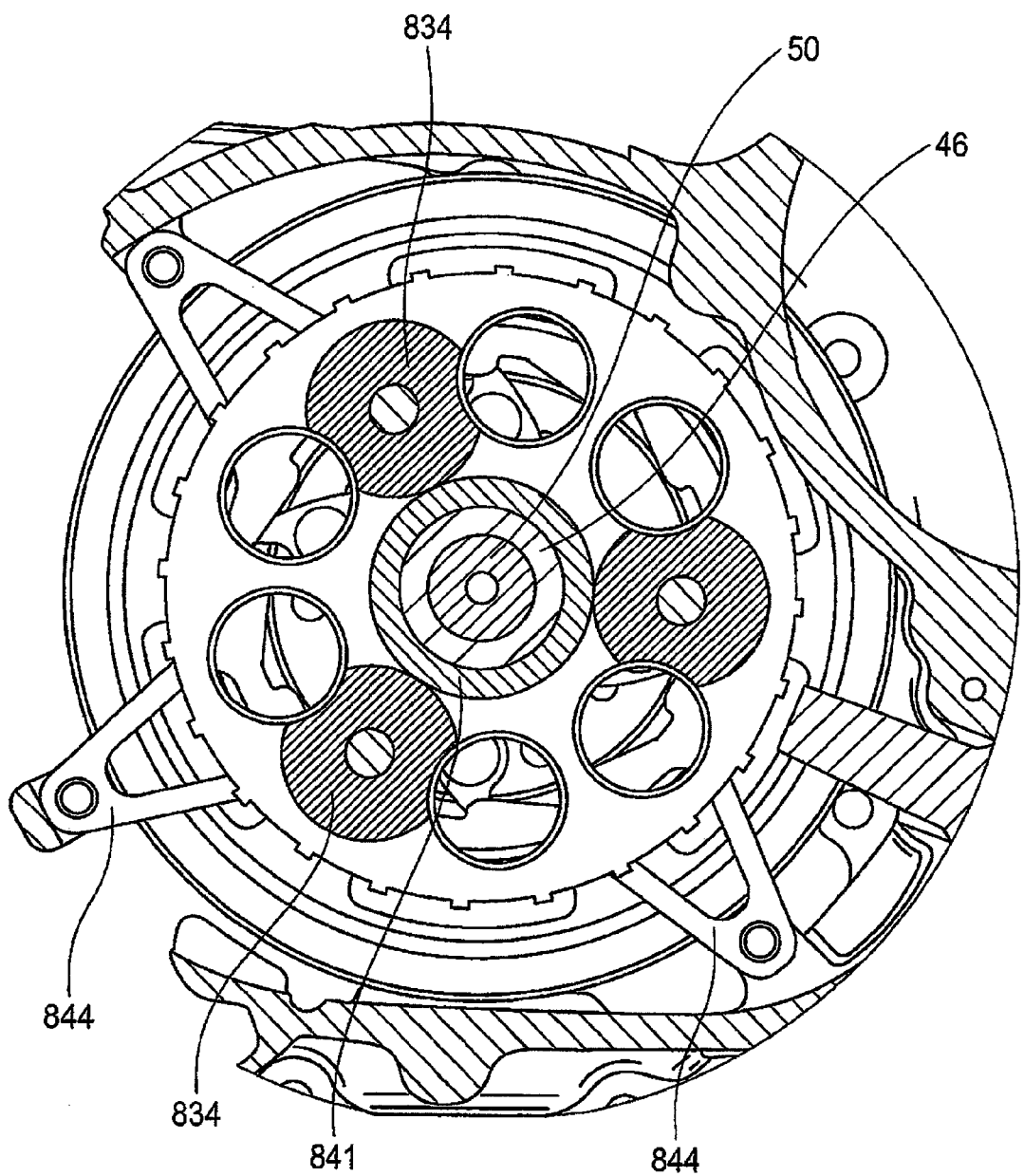
FIG. 6 is a sectional view taken along the line VI-VI of FIG. 4.
Figure 7:
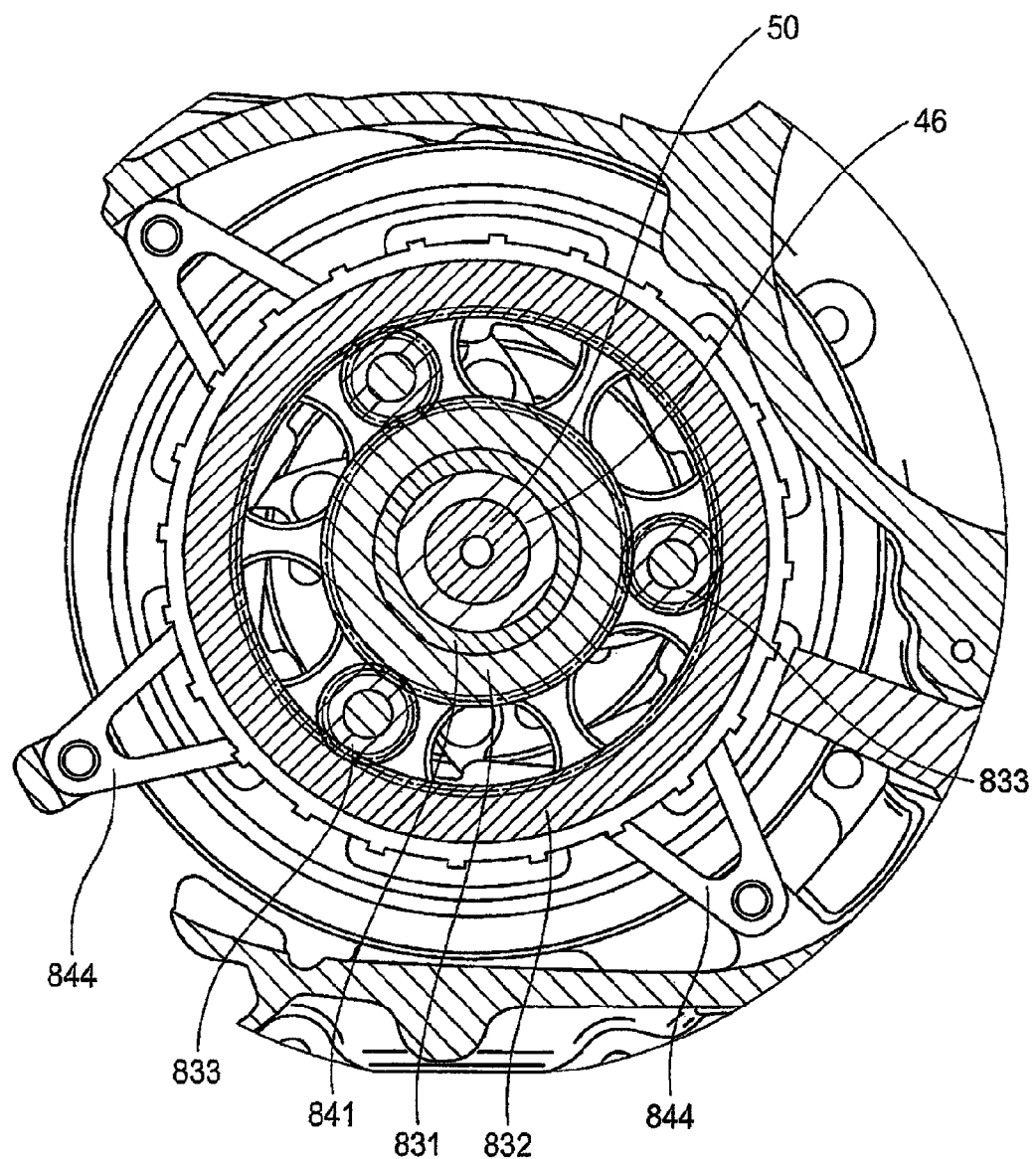
FIG. 7 is a sectional view taken along the line VII-VII of FIG. 4.

Hereinafter, a power unit for the hybrid vehicle according to this embodiment will be described in detail with reference to FIGS. 2 and 3. FIGS. 2 and 3 are sectional views of the power unit for the motorcycle shown in FIG. 1, in which reference sign O denotes a vehicle center line showing the center in the width direction.

The power unit P is composed chiefly of the engine 5 and the motor 6 serving as drive sources, the power transmission mechanism 7 for transmitting powers of the engine 5 and the motor 6 to the drive wheel WR, a double centrifugal clutch 8 serving as a variable speed mechanism for shifting power of the engine 5 between the engine 5 and the power transmission mechanism 7 to transmit the power to the power transmission mechanism 7, and an oil pump 9.

A battery not shown is connected to the motor 6 and the starter motor 33. When the motor 6 functions as a motor and when the starter motor 33 functions as a starter, the battery is configured to supply power to the motor 6 and the starter motor 33. Also, when the motor 6 functions as a generator, the battery is configured to be charged with regenerative electric power. Here, the battery may be mounted, for example, in a space axially adjacent to the fuel tank 34 as shown by reference sign B1 of FIG. 1 or alternatively, may be mounted in a space within the left and right leg shields 26b as shown by reference sign B2.

A throttle valve 321 (see FIG. 15) for controlling the amount of air is turnably provided within an intake pipe of the engine 5. The throttle valve 321 is housed within the throttle mechanism 32 to be turned according to a manipulated variable of a throttle grip not shown operated by an occupant. In this embodiment, there is installed a TBW (throttle-by-wire) system for detecting an accelerator opening operated by the occupant and calculating an optimum opening of the throttle valve 321 on the basis of the detected accelerator opening and signals from various kinds of sensors to perform opening and closing of the throttle valve 321 with an actuator 320 (see FIG. 12) on the basis of the calculated throttle opening. In FIG. 12, a throttle body 321 is provided that constitutes an intake passage 322 connecting the engine 5 and the air cleaner 36; a throttle valve shaft 323; an injector 324; an engine hanger 570 and an exhaust pipe 558.

The engine 5 includes a piston 52 coupled to the crankshaft 50 through a connecting rod 51. The piston 52 is slidable within a cylinder 54 provided in a cylinder block 53, and the cylinder block 53 is provided in such a manner that the axis C of the cylinder 54 is substantially horizontal. A cylinder head 55a and a head cover 55b are fixed to a front surface of the cylinder block 53. Also, a combustion chamber for burning an air-fuel mixture therein is formed by the cylinder head 55a, the cylinder 54, and the piston 52. As shown in FIG. 1, the leg shield 26b is provided on either side of the head cover 55b.

In the cylinder head 55a, there are provided valves 551 and 552 (see FIG. 15) for controlling intake or exhaust of the air-fuel mixture into or from the combustion chamber, and a spark plug 56. The opening and closing of the valves 551 and 552 are controlled by rotation of a camshaft 37 journaled to the cylinder head 55a. The camshaft 37 is provided with a driven sprocket 38 on one end thereof, and an endless cam chain 39 is stretched between the driven sprocket 38 and a drive sprocket 40 provided on one end of the crankshaft 50. Also, a starter driven gear 41 connected to the starter motor 33 is integrally attached, by spline-fitting, to the crankshaft 50, adjacent to the drive sprocket 40.

The crankshaft 50 is supported through respective bearings 42 by a left crankcase 57L and a right crankcase 57R (hereinafter, the combination of the left crankcase 57L and the right crankcase 57R will be referred to as a crankcase 57). A stator case 43 is coupled to the left side in the lateral direction of the crankcase 57, and an alternator 44 (an AC generator ACG) serving as an outer rotor motor is accommodated within the stator case 43. A crankcase cover 80 for containing the double centrifugal clutch 8 is coupled to the right side in the lateral direction of the crankcase 57. In addition, a clutch cover 85 for supporting the crankshaft 50 through a bearing 45 is coupled to a right-hand edge of the crankcase cover 80. A motor case 60 is coupled to a space in front of the inside of the crankcase cover 80, lateral to the cylinder block 53. The motor 6 with a motor drive gear 62 attached to a motor output shaft 61, is integrally accommodated within the motor case 60.

Furthermore, an outer rotor 442 opposed to an inner stator 441 constituting the alternator 44 is attached to a left-hand end of the crankshaft 50, and a first clutch inner 81 of the double centrifugal clutch 8 is spline-fitted in a right-hand end of the crankshaft 50. Also, on the crankshaft 50, a primary drive gear 58 and an outer circumferential shaft 46 are disposed between the connecting rod 51 and the first clutch inner 81 in such a manner so as to be rotatable relative to the crankshaft 50 and to cover the outer circumference of the crankshaft 50.

The primary drive gear 58 engages with a primary driven gear 72 attached to a main shaft 70 of the power transmission mechanism 7 to be described later. Also, a motor driven gear 59 having a diameter larger than that of the primary drive gear 58 is attached adjacent to the primary drive gear 58 in an integrally rotatable manner.

The motor driven gear 59 engages with the motor drive gear 62, with an inner diameter of the motor driven gear 59 configured to have a right-hand opening space, and is connected to the outer circumferential shaft 46 through a one-way clutch 47 accommodated in the space.

The one-way clutch 47 is engaged to transmit power from the outer circumferential shaft 46 to the motor driven gear 59 when the rotational speed of the outer circumferential shaft 46 is higher than that of the motor driven gear 59, and the one-way clutch 47 is disengaged to cut off transmission of power when the rotational speed of the motor driven gear 59 is higher than that of the outer circumferential shaft 46.

The double centrifugal clutch 8 is composed of, for example, as shown in FIGS. 4 to 7, the first clutch inner 81, a second clutch inner 82, a planetary gear mechanism 83, and a ratchet clutch mechanism 84. As described above, the first clutch inner 81 is spline-fitted in the crankshaft 50 to rotate integrally with the crankshaft 50. On the other hand, the second clutch inner 82 is spline-fitted in the outer circumference of the outer circumferential shaft 46 to be configured to rotate integrally with the outer circumferential shaft 46.

The planetary gear mechanism 83 is composed of a sun gear 831, a ring gear 832, planetary gears 833 to engage between the sun gear 831 and the ring gear 832, and planetary carriers 834 for supporting the planetary gears 833. The planetary carriers 834 are connected to the second clutch inner 82 to be configured to rotate integrally therewith.

The ring gear 832 functions as a clutch outer of the first clutch inner 81 and the second clutch inner 82. When the rotational speed of the first clutch inner 81 reaches a first predetermined rotational speed, a weight of the first clutch inner 81 comes into contact with an inner peripheral surface of the ring gear 832 to be brought into an engaged state. Further, when the rotational speed of the second clutch inner 82 reaches a second predetermined rotational speed higher than the first predetermined rotational speed, a weight of the second clutch inner 82 comes into contact with an inner peripheral surface of the ring gear 832 to be brought into an engaged state. The sun gear 831 is connected to the ratchet clutch mechanism 84.

The ratchet clutch mechanism 84 is composed of a ratchet supporting member 841 disposed on the outer circumference of the outer circumferential shaft 46 in a relatively rotatable manner and having a flange 840; a plurality of ratchets 843 supported by the flange 840; and a ratchet receiving portion 844 extended from the crankcase cover 80. The sun gear 831 of the planetary gear mechanism 83 is spline-fitted in the outer circumference of the ratchet supporting member 841 to be configured to rotate integrally therewith. Also, when the ratchet supporting member 841 attempts to rotate counterclockwise using power from the sun gear 831, the ratchets 843 engage with grooves 845 of the ratchet receiving portion 844 extended from the crankcase cover 80 to lock the rotation of the ratchet supporting member 841. On the contrary, when the ratchet supporting member 841 attempts to rotate clockwise, on the contrary, the ratchets 843 do not engage with the grooves 845 of the ratchet receiving portion 844 to idle the ratchet supporting member 841. Also, vibration-proof rubbers 846 are attached by baking to the respective grooves 845.

In the double centrifugal clutch 8 constructed in this manner, when the rotational speed of the crankshaft 50 is lower than the first predetermined rotational speed, the first clutch inner 81 rotated integrally with the crankshaft 50 has non-contact with an inner peripheral surface of the ring gear 832 to be brought into a disengaged state, so that power of the crankshaft 50 is prevented from being transmitted to the power transmission mechanism 7.

On the other hand, when the rotational speed of the crankshaft 50 reaches the first predetermined rotational speed, the weight of the first clutch inner 81 comes into contact with an inner peripheral surface of the ring gear 832 to be brought into an engaged state. At this time, the ring gear 832 rotates clockwise, and the planetary carriers 834 also rotate clockwise through the planetary gears 833 engaging with the ring gear 832, so that a counterclockwise rotational torque acts on the sun gear 831. Also, a counterclockwise rotational torque acts on the ratchets 843 through the ratchet supporting member 841 spline-fitted in the sun gear 831 to engage the ratchets 843 with the grooves 845 of the ratchet receiving portion 844, thereby locking the sun gear 831. Therefore, power transmitted from the crankshaft 50 to the planetary carriers 834 is decelerated to be transmitted to the outer circumferential shaft 46 rotated integrally with the planetary carriers 834. When the rotational speed of the outer circumferential shaft 46 is higher than that of the motor driven gear 59 engaging with the motor drive gear 62, the one-way clutch 47 is engaged to transmit power of the crankshaft 50 to the primary drive gear 58 rotated integrally with the motor driven gear 59, and then transmit the power to the power transmission mechanism 7 through the primary driven gear 72 by engagement of the primary driven gear 72 with the primary drive gear 58.

On the other hand, when, through the drive of the motor 6, the rotational speed of the motor driven gear 59 is higher than that of the outer circumferential shaft 46, the one-way clutch 47 is disengaged to prevent power of the crankshaft 50 from being transmitted to the power transmission mechanism 7.

Also, when, through the engagement of the first clutch inner 81, the rotational speed of the second clutch inner 82 following the rotation of the planetary carriers 834 reaches the second predetermined rotational speed, the weight of the second clutch inner 82 comes into contact with the inner peripheral surface of the ring gear 832 to be brought into an engaged state. At this time, the ring gear 832 and the planetary carriers 834 rotate integrally through the second clutch inner 82, and are also integrated with the sun gear 831. That is to say, the planetary gear mechanism 83 is brought into an integrated state. At this time, a clockwise rotational torque acts on the ratchets 843 through the ratchet supporting member 841 spline-fitted in the sun gear 831, and the ratchets 843 do not engage with the grooves 845 of the ratchet receiving portion 844 to idle the ratchet supporting member 841. Therefore, power transmitted from the crankshaft 50 to the planetary gear mechanism 83 is transmitted, without decelerating, to the outer circumferential shaft 46 rotated integrally with the planetary carriers 834. Also, when the rotational speed of the outer circumferential shaft 46 is higher than that of the motor driven gear 59 engaging with the motor drive gear 62 of the motor 6, the one-way clutch 47 is engaged to transmit power of the crankshaft 50 to the primary drive gear 58 rotated integrally with the motor driven gear 59, and then transmit the power to the power transmission mechanism 7 through the primary driven gear 72 by engagement of the primary driven gear 72 with the primary drive gear 58.

On the other hand, when, through the drive of the motor 6, the rotational speed of the motor driven gear 59 is higher than that of the outer circumferential shaft 46, the one-way clutch 47 is disengaged to prevent power of the crankshaft 50 from being transmitted to the power transmission mechanism 7.

As described above, the motor 6 is constructed with the motor drive gear 62 attached to the motor output shaft 61, and the motor drive gear 62 always engages with the motor driven gear 59 provided around the crankshaft 50. Therefore, the power of the motor 6 is transmitted to the motor driven gear 59 by engagement of the motor drive gear 62 and the motor driven gear 59 with each other, and then, transmitted from the primary drive gear 58 rotated integrally with the motor driven gear 59 to the power transmission mechanism 7 through the primary driven gear 72 by engagement of the primary driven gear 72 with the primary drive gear 58. The motor driven gear 59 is connected to the outer circumferential shaft 46 through the one-way clutch 47, and therefore, the power of the motor 6 is transmitted to the power transmission mechanism 7 only when the rotational speed of the motor driven gear 59 is higher than that of the outer circumferential shaft 46. At this time, the one-way clutch 47 is disengaged to prevent the power of the motor 6 from being transmitted to the outer circumferential shaft 46. On the other hand, when the rotational speed of the outer circumferential shaft 46 is higher than that of the motor driven gear 59, the power of the crankshaft 50 is transmitted to the power transmission mechanism 7, so that the motor 6 follows the rotation of the crankshaft 50. At this time, according to the state of charge (SOC) of the battery, an assist by the motor 6 may be carried out or alternatively, regenerative charge may be performed. Also, the load can be reduced by zero torque control.

Next, the power transmission mechanism 7 will be described.

The power transmission mechanism 7 is provided with a variable speed portion 73 between the main shaft 70 and a countershaft 71. As described above, the primary driven gear 72 to engage with the primary drive gear 58 provided on the outer circumference of the crankshaft 50, is attached to a right-hand end of the main shaft 70. A drive sprocket 74 is attached to a left-hand end of the countershaft 71, and the power transmitted to the main shaft 70 is transmitted to the drive wheel WR through the drive chain 31 (see FIG. 1) wound around the drive sprocket 74. On a right-hand end of the countershaft 71, there is provided a vehicle-speed detecting output gear 77 to engage with a vehicle-speed detecting input gear 76 rotatably provided on a sub-shaft 75. Also, in the crankcase 57, a detector 78 for detecting speed is provided at a position opposite to the vehicle-speed detecting input gear 76.

The variable speed portion 73 is composed of a low-speed drive gear 731 provided on the outer circumference of the main shaft 70 in a relatively rotatable manner; a high-speed drive-shifter gear 732 disposed on the outer circumference of the main shaft 70 to rotate integrally with the main shaft 70, and provided slidably along an axis of the main shaft 70; a low-speed driven gear 733 spline-fitted in the outer circumference of the countershaft 71 to rotate integrally with the countershaft 71; a high-speed driven gear 734 provided on the outer circumference of the countershaft 71 in a relatively rotatable manner and a shifter 735 disposed on the outer circumference of the countershaft 71 to rotate integrally with the countershaft 71, and provided slidably along an axis of the countershaft 71. The low-speed drive gear 731 and the low-speed driven gear 733 always engage with each other to constitute a low-speed gear pair 736. The high-speed drive-shifter gear 732 and the high-speed driven gear 734 always engage with each other to constitute a high-speed gear pair 737.

Under normal conditions, the variable speed portion 73 is set so that the vehicle travels in a drive mode using the high-speed gear pair 737. When a larger torque is required, the vehicle is allowed to travel in a low-speed mode using the low-speed gear pair 736. Therefore, an occupant swings a shift pedal (not shown), thereby shifting from neutral to the drive mode, or to the low-speed mode.

Figure 8:
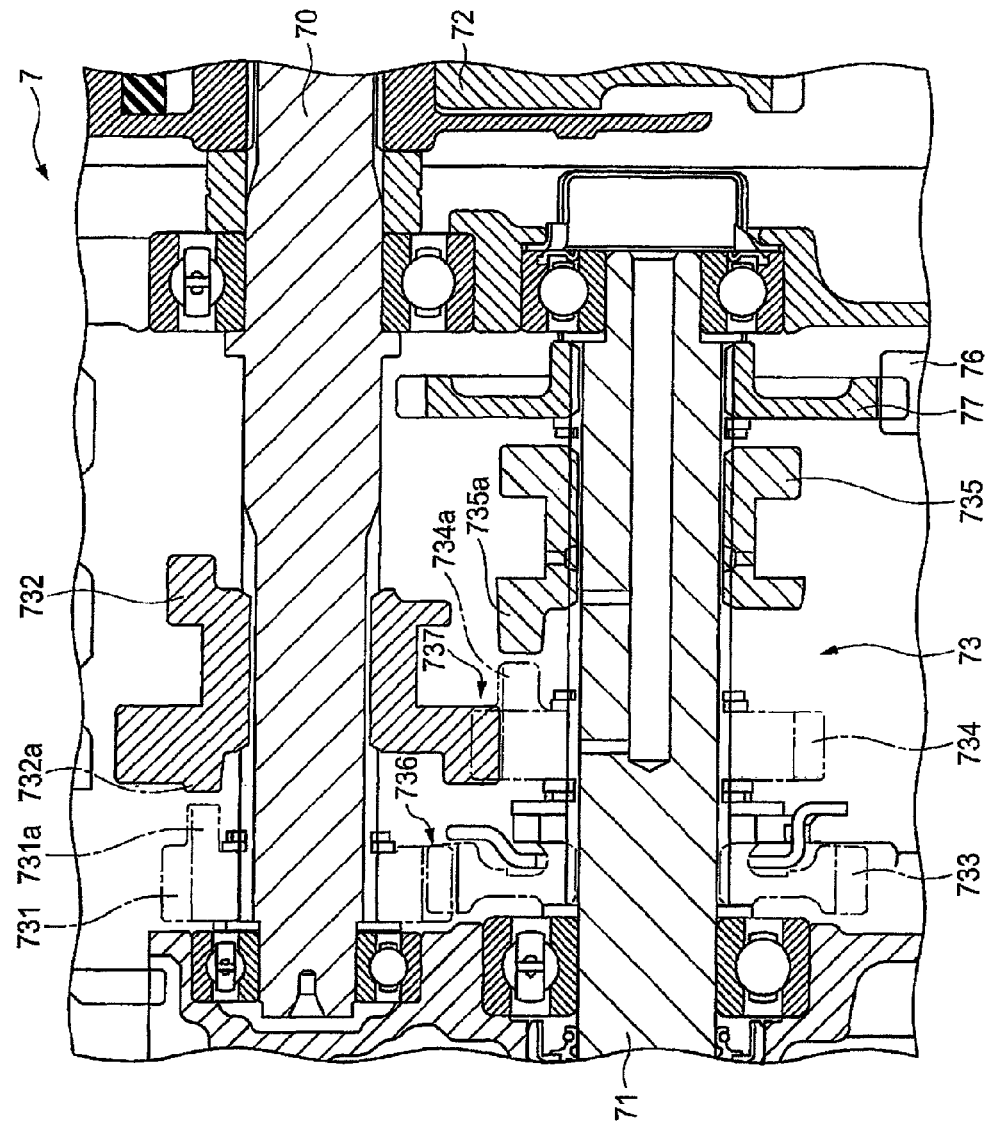
FIG. 8 is a sectional view, in neutral, of a variable speed portion of the power unit.

In neutral, as shown in FIG. 8, the high-speed drive-shifter gear 732 and the low-speed drive gear 731 do not engage with each other. Also, the shifter 735 and the high-speed driven gear 734 do not engage with each other. Even when the main shaft 70 rotates, therefore, transmission of power to the countershaft 71 through both the low-speed gear pair 736 and through the high-speed gear pair 737 is prevented.

Figure 9:
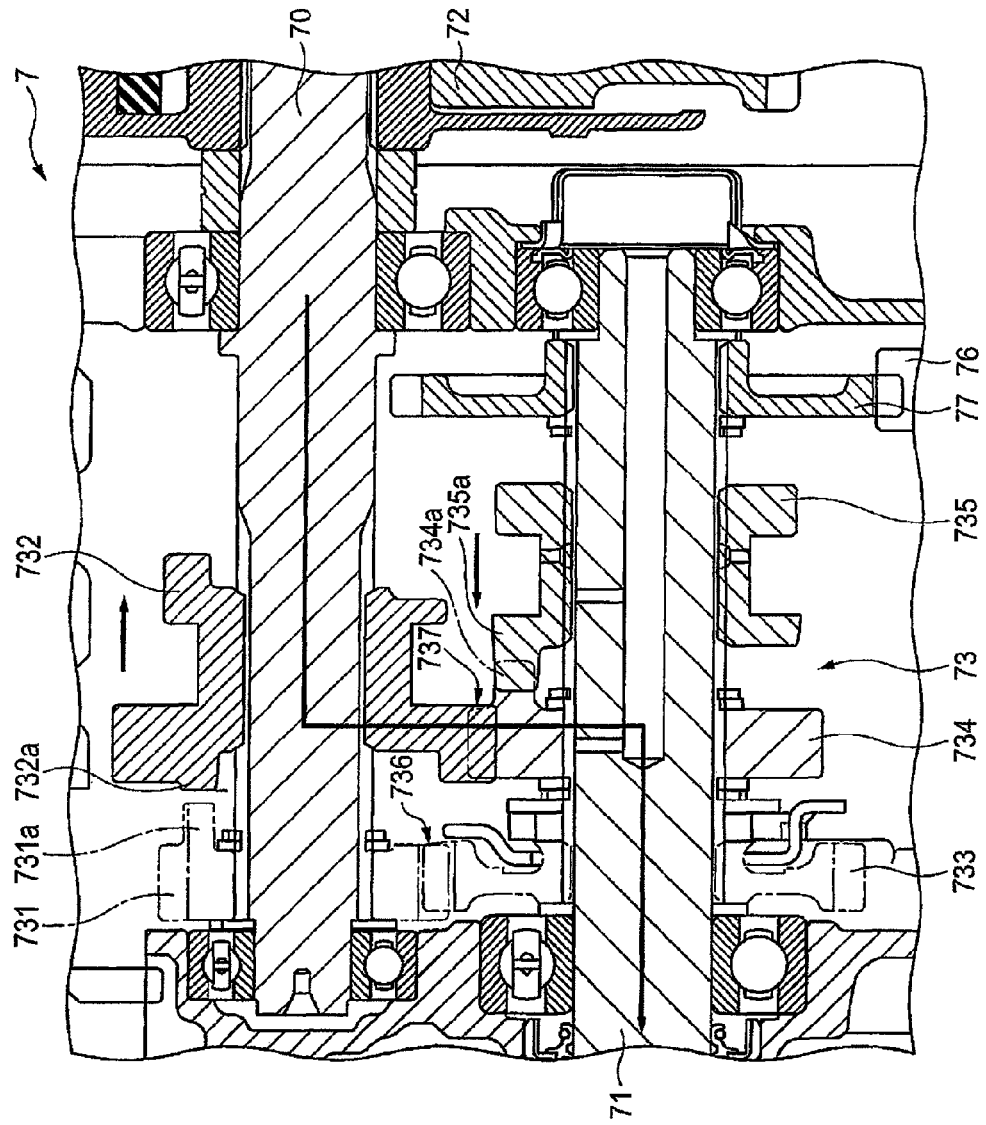
FIG. 9 is a sectional view, with a drive mode selected, of the variable speed portion of the power unit.

When the occupant swings the shift pedal (not shown) to one side to select the drive mode from neutral, the shifter 735 slides to the high-speed driven gear 734 to engage an engagement portion 734*a* formed on the high-speed driven gear 734 and an engagement portion 735*a* formed on the shifter 735 with each other, as shown in FIG. 9. Thus, as shown by arrows in the drawing, the power input into the main shaft 70 is transmitted from the high-speed drive-shifter gear 732 to the drive sprocket 74 of the countershaft 71 through the high-speed gear pair 737 and the shifter 735. On the other hand, when the occupant swings the shift pedal to the other side to shift back into neutral, the shifter 735 is returned to the neutral position to release the engagement between the engagement portion 734*a* and the engagement portion 735*a*.

Figure 10:
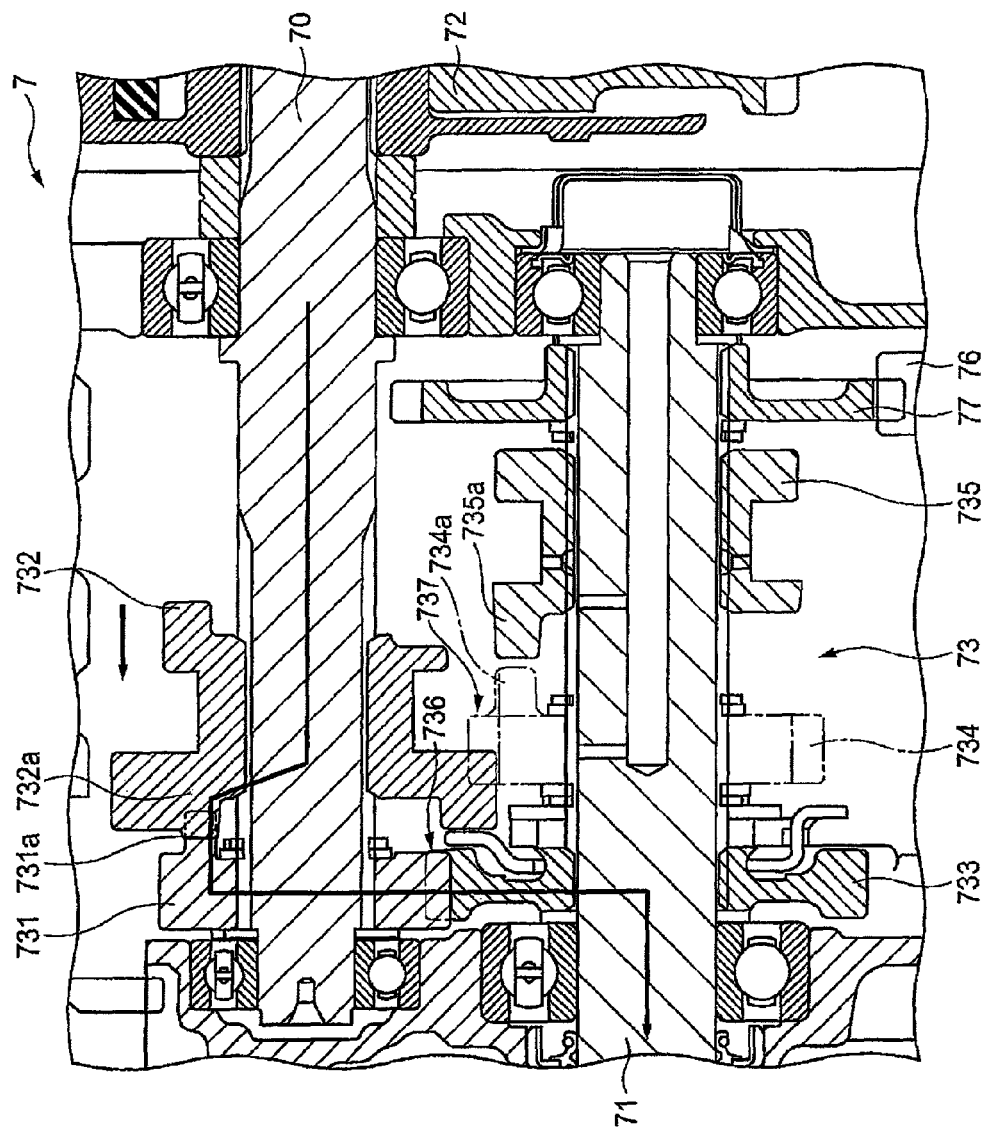
FIG. 10 is a sectional view, with a low-speed mode selected, of the variable speed portion of the power unit.

Meanwhile, when the occupant swings the shift pedal to further one side to select the low-speed mode from the drive mode, the shifter 735 is returned to the neutral position to release the engagement between the engagement portion 734*a* and the engagement portion 735*a*, and the high-speed drive-shifter gear 732 slides to the low-speed drive gear 731 to engage an engagement portion 731*a* formed on the low-speed drive gear 731 and an engagement portion 732*a* formed on the high-speed drive-shifter gear 732 with each other, as shown in FIG. 10. Thus, power input into the main shaft 70 is transmitted to the drive sprocket 74 of the countershaft 71 through the high-speed drive-shifter gear 732 and the low-speed gear pair 736. Also, when the occupant swings the shift pedal to one side or to the other side to select the drive mode from the low-speed mode or to shift back into neutral, the vehicle is put into the drive mode or neutral as described above.

According to the power unit P for the hybrid vehicle constructed in this manner, the motorcycle 1 can travel by transmitting power through the following two transmission paths, a first transmission path and a second transmission path.

[1] The first transmission path is a transmission path for a so-called engine running, in which power of the engine 5 is transmitted to the drive wheel WR through the crankshaft 50, the double centrifugal clutch 8, the outer circumferential shaft 46, the one-way clutch 47, the motor driven gear 59 (the primary drive gear 58), the primary driven gear 72, and the power transmission mechanism 7. In the first transmission path, two-speed change can be performed by the double centrifugal clutch 8 and the variable speed portion 73 of the power transmission mechanism 7. Also, during running while transmitting power through the first transmission path, assist running can be carried out by driving the motor 6 or alternatively, regenerative charge may be performed by using the motor 6 as a load.

[2] The second transmission path is a transmission path for a so-called EV running, in which power of the motor 6 is transmitted to the drive wheel WR through the motor output shaft 61, the motor drive gear 62, the motor driven gear 59 (the primary drive gear 58), the primary driven gear 72, the power transmission mechanism 7, and the drive chain 31. At this time, as described above, transmission of the power of the motor 6 to the crankshaft 50 is prevented by idling of the one-way clutch 47. Also, in the second transmission path, two-speed change can be performed by the variable speed portion 73 of the power transmission mechanism 7.

Switching between the first transmission path and the second transmission path is automatically performed by the one-way clutch 47. On the basis of the rotational speed of the motor driven gear 59 provided on the outer diameter side of the one-way clutch 47 and the rotational speed of the outer circumferential shaft 46 provided on the inner diameter side of the one-way clutch 47, when the rotational speed of the outer circumferential shaft 46 is higher than that of the motor driven gear 59, the power is transmitted through the first transmission path. On the other hand, when the rotational speed of the motor driven gear 59 is higher than that of the outer circumferential shaft 46, the power is transmitted through the second transmission path.

In the power unit P constructed in this manner, as shown in FIG. 2, the motor 6 and the double centrifugal clutch 8 are disposed in a one-sided manner in the vehicle width direction with respect to the engine 5, and the vehicle center line O is located between the center of the piston 52 of the engine 5 and the motor 6.

Next, oil lubrication according to the present invention will be described with reference to FIGS. 11 to 15. In FIGS. 12 and 15, arrows show the directions in a state in which the power unit is mounted on the vehicle.

Figure 11:
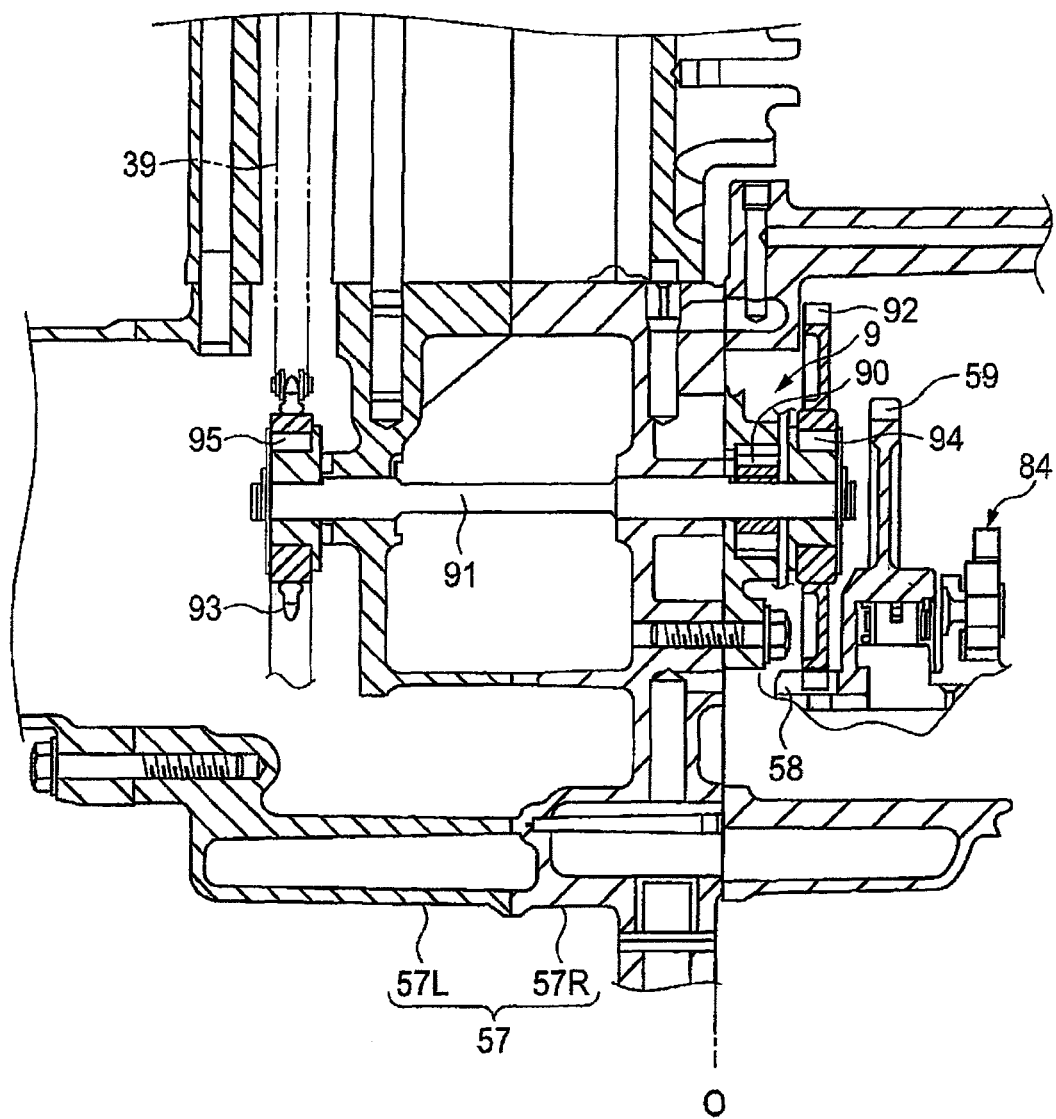
FIG. 11 is a partially enlarged view of FIG. 3.

As shown in FIG. 11, the oil pump 9 is composed of an oil pump main body 90, an oil pump driven gear 92, serving as a first input portion, provided on a right-hand end of an oil pump shaft 91 through the oil pump main body 90, and an oil pump driven sprocket 93, serving as a second input portion, provided on a left-handed end of the oil pump shaft 91. Also, the oil pump 9 is disposed below and rearward of the motor 6 in side view as shown in FIG. 12 to supply oil to the respective portions, such as the engine 5 and the power transmission mechanism 7, of the power unit P.

The oil pump driven gear 92 is provided on the oil pump shaft 91 through a one-way clutch 94 to always engage with the primary drive gear 58 for transmitting power from the engine 5 and the motor 6 to the power transmission mechanism 7. The one-way clutch 94 is engaged to transmit power of the oil pump driven gear 92 to the oil pump shaft 91 when the rotational speed of the oil pump driven gear 92 provided on the outer diameter side of the one-way clutch 94 is higher than that of the oil pump shaft 91 provided on the inner diameter side thereof. The one-way clutch 94 is disengaged to cut off transmission of power when the rotational speed of the oil pump shaft 91 is higher than that of the oil pump driven gear 92.

The oil pump driven sprocket 93 is provided on the oil pump shaft 91 through a one-way clutch 95 to be connected to the cam chain 39 stretched between the driven sprocket 38 of the camshaft 37 and the drive sprocket 40 of the crankshaft

50. The one-way clutch 95 is engaged to transmit power of the oil pump driven sprocket 93 to the oil pump shaft 91 when the rotational speed of the oil pump driven sprocket 93 provided on the outer diameter side of the one-way clutch 95 is higher than that of the oil pump shaft 91 provided on the inner diameter side thereof. The one-way clutch 95 is disengaged to cut off transmission of power when the rotational speed of the oil pump shaft 91 is higher than that of the oil pump driven sprocket 93.

That is to say, on the basis of a difference in rotational speed between the oil pump driven gear 92 and the oil pump driven sprocket 93 provided on either end of the oil pump shaft 91, when the rotational speed of the oil pump driven gear 92 is higher than that of the oil pump driven sprocket 93, the one-way clutch 94 is engaged to transmit power of the oil pump driven gear 92 to the oil pump shaft 91 through the one-way clutch 94. At this time, the one-way clutch 95 is disengaged. Therefore, transmission of power of the oil pump shaft 91 to the oil pump driven sprocket 93 is prevented. On the other hand, when the rotational speed of the oil pump driven sprocket 93 is higher than that of the oil pump driven gear 92, the one-way clutch 95 is engaged to transmit power of the oil pump driven sprocket 93 to the oil pump shaft 91 through the one-way clutch 95. At this time, the one-way clutch 94 is disengaged, and therefore, transmission of power of the oil pump shaft 91 to the oil pump driven gear 92 is prevented. Here, the oil pump driven sprocket 93 has a gear ratio set to be rotatable at higher speed than the oil pump driven gear 92.

In the oil pump 9 constructed in this manner, the oil pump main body 90 is located between the crankcase 57 for supporting the crankshaft 50 and the motor driven gear 59, and the oil pump driven gear 92 is located between the oil pump main body 90 and the motor driven gear 59. Also, the oil pump driven gear 92 is provided on the cylinder 54 on one side in the axial direction of the crankshaft 50, and the oil pump driven sprocket 93 is provided on the cylinder 54 on the other side in the axial direction of the crankshaft 50. At the time of the engine running, power is input from the oil pump driven sprocket 93 by rotation of the crankshaft 50. At the time of the motor running, power is input from the oil pump driven gear 92 by rotation of the primary drive gear 58. Furthermore, at the time of motor assist running, power is transmitted from the oil pump driven sprocket 93 on the high-speed rotation side, thereby performing proper lubrication according to a running condition.

Figure 13:
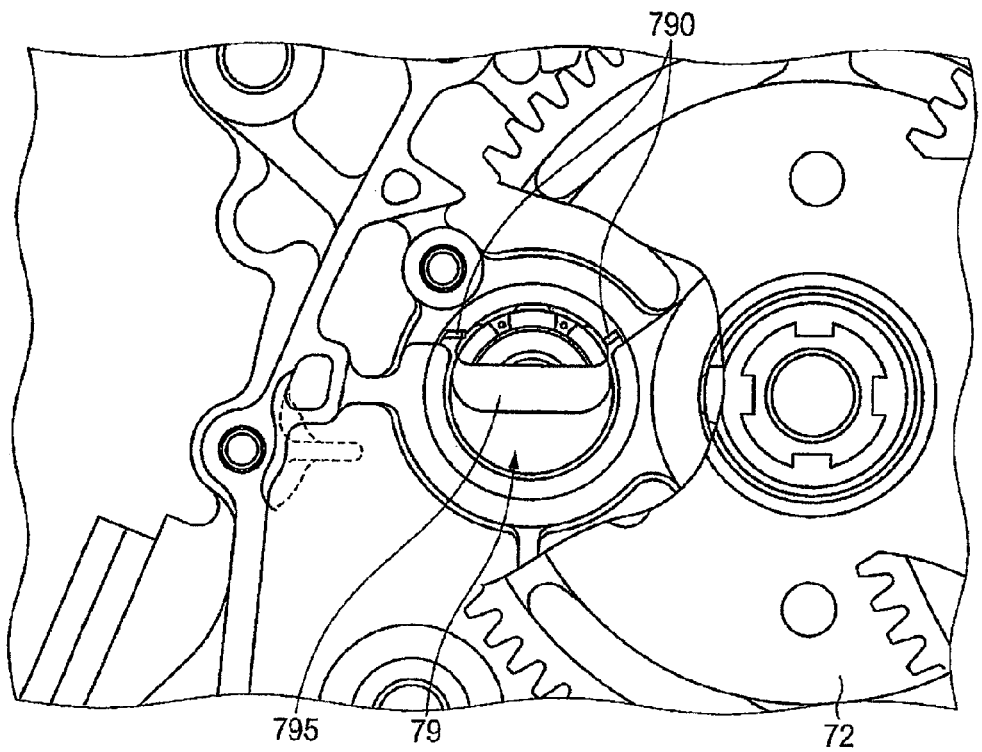
FIG. 13 is a partially enlarged view of FIG. 12.
Figure 14:
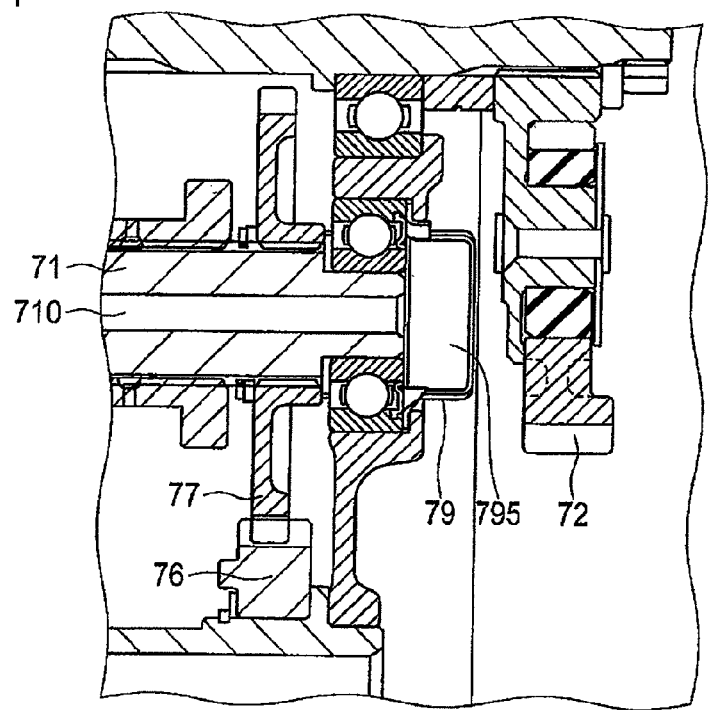
FIG. 14 is a partially enlarged view of an end of a countershaft.
Figure 15:
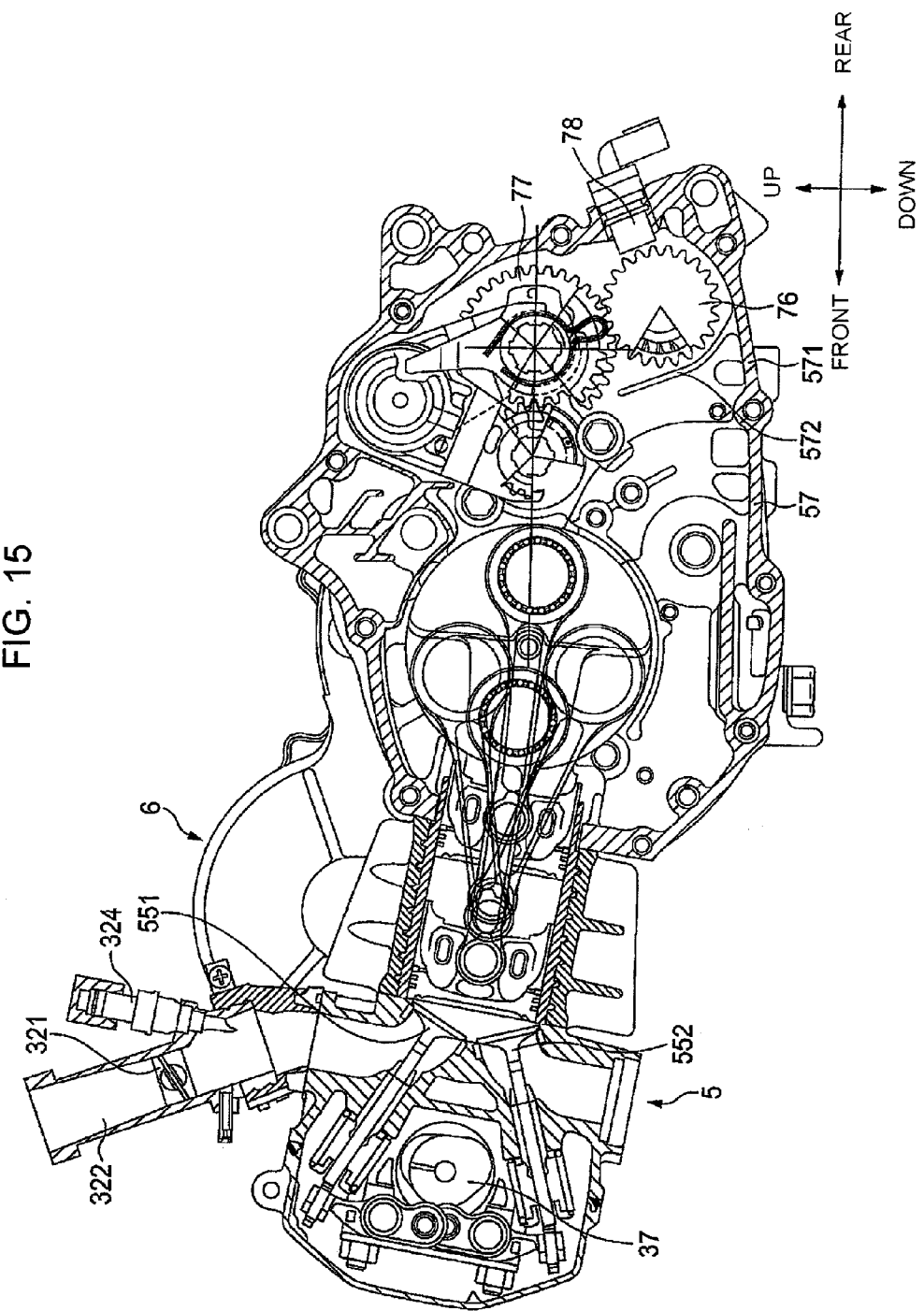
FIG. 15 is a sectional view perpendicular to an axial direction of the power unit for the motorcycle shown in FIG. 1.

Also, as shown in FIGS. 13 and 14, on a right-hand end of the countershaft 71 of the power transmission mechanism 7, there is provided a splash oil recovery member 79 for receiving oil splashed from the gears such as the primary drive gear 58 and the primary driven gear 72 to guide the oil into an oil passage 710 formed within the countershaft 71. The splash oil recovery member 79 is fixed to the crankcase 57 in such a manner so as to be prevented from rotating by a rotation stopper 790, and a receiving portion 795 opens toward the primary drive gear 58 and the primary driven gear 72.

Further, on the crankcase 57, as shown in FIG. 15, a rib 572 directed toward a gear train composed of the low-speed gear pair 736 and the high-speed gear pair 737 of the power transmission mechanism 7, extends forward from a lower surface 571. Also, oil is accumulated in a space formed by the crankcase 57 and the rib 572 so that a portion of the vehicle-speed detecting input gear 76 is soaked in the oil. Therefore, the oil is supplied to the gear train of the power transmission mechanism 7 by rotation of the vehicle-speed detecting input gear 76.

As described above, according to the hybrid vehicle of this embodiment, in the oil pump 9, the oil pump driven gear 92 serving as a first input portion is provided on the oil pump shaft 91, and connected to the primary drive gear 58 serving as an output portion rotating integrally with the motor driven gear 59 for transmitting power of the motor 6 to the power transmission mechanism 7. Even when the EV running is performed by the motor 6, the engine 5 and the power transmission mechanism 7 can be lubricated by driving the oil pump 9. Thus, even in a stopped state of the crankshaft 50 during the EV running, the engine 5 and the power transmission mechanism 7 can be lubricated.

The oil pump driven gear 92 rotated by power of the motor 6 is provided on one end of the oil pump shaft 91 through the one-way clutch 94. Also, the oil pump driven sprocket 93 connected to the cam chain 39 of the engine 5 to be rotated by power of the engine 5 is provided on the other end of the oil pump shaft 91 through the one-way clutch 95. Therefore, the engine 5 and the power transmission mechanism 7 can be lubricated by driving the oil pump 9 selectively using one of the engine 5 and the motor 6.

Furthermore, the motor driven gear 59 is disposed on one side of the crankshaft 50, and the cam chain 39 is disposed on the other side of the crankshaft 50. Therefore, it is possible to reduce a lateral expansion, and in particular, to prevent one-sided expansion of the crankshaft 50.

Also, the oil pump 9 is rotated either with the oil pump driven gear 92 rotated by power of the motor 6 or with the oil pump driven sprocket 93 rotated by power of the engine 5, whichever is higher in rotational speed. This allows proper lubrication according to a running condition.

Furthermore, the oil pump main body 90 is located between the crankcase 57 for supporting the crankshaft 50 and the motor driven gear 59. Also, the oil pump driven gear 92 is located between the oil pump main body 90 and the motor driven gear 59. Therefore, the oil pump main body 90 can be disposed in a limited space.

Also, the oil pump driven gear 92 and the oil pump driven sprocket 93 are provided opposite to each other on the cylinder 54, thereby allowing distribution of a necessary space between both sides of the cylinder 54, and miniaturization of the oil pump 9.

Moreover, the oil pump main body 90 is located between the oil pump driven gear 92 and the oil pump driven sprocket 93. Thus, the oil pump main body 90 can be disposed in a limited space.

Also, the oil pump driven sprocket 93 has a gear ratio allowing higher-speed rotation than the oil pump driven gear 92. Therefore, after engine starting, the oil pump 9 is driven by the cam chain 37, thereby allowing proper lubrication.

In addition, the splash oil recovery member 79 for receiving oil splashed from the gears is provided on an end of the countershaft 71 of the power transmission mechanism 7, and the oil stored in the oil recovery member 79 is lubricated through the oil passage 710 within the countershaft 71, thereby allowing efficient recovery and lubrication of the splashed oil.

Further, the vehicle-speed detecting input gear 76 is provided below the countershaft 71 at such a position as to be soaked in the oil accumulated on a lower surface 571 of the crankcase 57. Also, the rib 572 extended forward from the crankcase 57 is directed toward the variable speed gear train of the power transmission mechanism 7. Therefore, it is possible to efficiently supply lubricating oil to the variable speed gear train of the power transmission mechanism 7 by utilizing the rotation of the vehicle-speed detecting input gear 76.

It should be understood that the present invention is not limited to the above-described embodiment, and various changes, modifications or the like can be appropriately made.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hybrid vehicle comprising:
an internal combustion engine;
an electric motor;
a power transmission mechanism for transmitting power of the internal combustion engine and power of the electric motor to a driven portion; and
an oil pump for lubricating the internal combustion engine and the power transmission mechanism with a rotation of a crankshaft,
wherein the oil pump has an oil pump shaft, the oil pump shaft is provided with a first input portion on one end of the oil pump shaft through a first one-way clutch, and a second input portion on another end of the oil pump shaft through a second one-way clutch, the first input portion being connected to an output portion rotating integrally with a transmission member for transmitting power of the electric motor to the driven portion to be rotated by the power of the electric motor, the second input portion being connected to a cam chain of the internal combustion engine to be rotated by the power of the internal combustion engine, the first input portion being located between an oil pump main body and the transmission member; and
wherein the transmission member is disposed on one side of the crankshaft, and the cam chain is disposed on the other side of the crankshaft.

2. The hybrid vehicle according to claim 1, wherein the oil pump shaft rotates either with the first input portion rotated by the power of the electric motor or with the second input portion rotated by the power of the internal combustion engine, whichever is higher in rotational speed.

3. The hybrid vehicle according to claim 1, wherein the oil pump main body is located between a crankcase for supporting the crankshaft and the transmission member.

4. The hybrid vehicle according to claim 1, wherein the first input portion is provided on one side of a cylinder, and the second input portion is provided on the other side of the cylinder.

5. The hybrid vehicle according to claim 1, wherein the second input portion has a gear ratio allowing higher-speed rotation than the first input portion.

6. The hybrid vehicle according to claim 1, wherein a splash oil recovery member for receiving lubricating oil is provided on an end of a countershaft of the power transmission mechanism; and
the lubricating oil stored in the splash oil recovery member is lubricated through an oil passage within the countershaft.

7. The hybrid vehicle according to claim 1, wherein a vehicle-speed detecting gear is provided below a countershaft, at such a position as to be soaked in lubricating oil accumulated on a lower surface of a crankcase; and
a rib extending forward from the crankcase is directed toward a variable speed gear train of the power transmission mechanism.

8. The hybrid vehicle according to claim 1, wherein the first input portion is an oil pump driven gear mounted on the one end of the oil pump shaft.

9. The hybrid vehicle according to claim 1, wherein the second input portion is an oil pump driven sprocket mounted on the other end of the oil pump shaft.

10. A hybrid vehicle comprising:
an internal combustion engine;
an electric motor;
a power transmission mechanism for transmitting power of the internal combustion engine and power of the electric motor to a driven portion; and
an oil pump for lubricating the internal combustion engine and the power transmission mechanism with a rotation of a crankshaft,
wherein the oil pump has an oil pump shaft, the oil pump shaft is provided with a first input portion on one end of the oil pump shaft through a first one-way clutch, and a second input portion on another end of the oil pump shaft through a second one-way clutch, the first input portion being connected to an output portion rotating integrally with a transmission member for transmitting power of the electric motor to the driven portion to be rotated by the power of the electric motor, the second input portion being connected to a cam chain of the internal combustion engine to be rotated by the power of the internal combustion engine,
wherein the transmission member is disposed on one side of the crankshaft, and the cam chain is disposed on the other side of the crankshaft,
wherein an oil pump main body is located between the first input portion and the second input portion.

11. A hybrid vehicle comprising:
an internal combustion engine;
an electric motor;
a power transmission mechanism for selectively transmitting power of the internal combustion engine and power of the electric motor to a driven portion;
a crankshaft operatively connected to power transmission mechanism; and
an oil pump for lubricating the internal combustion engine and the power transmission mechanism with a rotation of the crankshaft;
said oil pump including:
an oil pump shaft including a first end and a second end;
a first input portion mounted on the first end of the oil pump shaft through a first one-way clutch;
a second input portion mounted on the second end of the oil pump shaft through a second one-way clutch; and
a transmission member for transmitting the power of the electric motor;
said first input portion being connected to an output portion rotating integrally with the transmission member for transmitting the power of the electric motor to the driven portion to be rotated by the power of the electric motor, the first input portion being located between an oil pump main body and the transmission member,
said second input portion being connected to a cam chain of the internal combustion engine to be rotated by the power of the internal combustion engine;
wherein the transmission member is disposed on one side of the crankshaft and the cam chain is disposed on the other side of the crankshaft.

12. The hybrid vehicle according to claim 11, wherein the oil pump shaft rotates either with the first input portion rotated by the power of the electric motor or with the second input portion rotated by the power of the internal combustion engine, whichever is higher in rotational speed.

13. The hybrid vehicle according to claim 11, wherein the oil pump main body is located between a crankcase for supporting the crankshaft and the transmission member.

14. The hybrid vehicle according to claim 11, wherein the first input portion is provided on one side of a cylinder, and the second input portion is provided on the other side of the cylinder.

15. The hybrid vehicle according to claim 11, wherein an oil pump main body is located between the first input portion and the second input portion.

16. The hybrid vehicle according to claim 11, wherein the second input portion has a gear ratio allowing higher-speed rotation than the first input portion.

17. The hybrid vehicle according to claim 11, wherein a splash oil recovery member for receiving lubricating oil is provided on an end of a countershaft of the power transmission mechanism; and the lubricating oil stored in the splash oil recovery member is lubricated through an oil passage within the countershaft.

18. The hybrid vehicle according to claim 11, wherein a vehicle-speed detecting gear is provided below a countershaft, at such a position as to be soaked in lubricating oil accumulated on a lower surface of a crankcase; and a rib extending forward from the crankcase is directed toward a variable speed gear train of the power transmission mechanism.

19. The hybrid vehicle according to claim 11, wherein the first input portion is an oil pump driven gear mounted on the one end of the oil pump shaft.

20. The hybrid vehicle according to claim 11, wherein the second input portion is an oil pump driven sprocket mounted on the other end of the oil pump shaft.

* * * * *